United States Patent
Alessio et al.

(10) Patent No.: US 9,432,191 B2
(45) Date of Patent: Aug. 30, 2016

(54) PUBLIC KEY ENCRYPTION SYSTEM BASED ON THE QUADRATIC RESIDUOSITY ASSUMPTION

(75) Inventors: Davide Alessio, Rennes (FR); Marc Joye, Fougeres (FR)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 13/877,946

(22) PCT Filed: Sep. 28, 2011

(86) PCT No.: PCT/EP2011/066883
§ 371 (c)(1),
(2), (4) Date: Apr. 5, 2013

(87) PCT Pub. No.: WO2012/045628
PCT Pub. Date: Apr. 12, 2012

(65) Prior Publication Data
US 2013/0195267 A1     Aug. 1, 2013

(30) Foreign Application Priority Data

Oct. 8, 2010   (EP) .................................... 10306103
Sep. 23, 2011  (EP) .................................... 11306214

(51) Int. Cl.
  *H04L 9/00*  (2006.01)
  *H04L 9/30*  (2006.01)
(52) U.S. Cl.
  CPC ....................................... *H04L 9/30* (2013.01)
(58) Field of Classification Search
  CPC ... G06F 2212/40; H04L 9/30; H04L 9/0618; H04L 9/06
  See application file for complete search history.

(56) References Cited

U.S. PATENT DOCUMENTS

2005/0169478 A1*   8/2005   Cramer et al. ................ 380/277

FOREIGN PATENT DOCUMENTS

EP        2625818         8/2013

OTHER PUBLICATIONS

Josh Benaloh: IIDense Probabilistic 1-9 Cryptographyll, Proceedings of the Workshop on Selected Areas of Cryptography, May 31, 2004, pp. 120-128, XP55014957.
Goldwasser S et al: "Probabilistic Encryption", Journal of Computer and System Sciences, Academic Press, Inc., London, GB, vol. 28, Jan. 1, 1984, pp. 270-299, XP000603911.
Search Report Dated Dec. 28, 2011.
Creado et al., "Probabilistic Encryption—A Practical Implementation", 2009 Fourth International Conference on Computer Sciences and Convergence Information Technology, Seoul, Korea, Nov. 24, 2009, pp. 1130-1136.

(Continued)

*Primary Examiner* — Izunna Okeke
(74) *Attorney, Agent, or Firm* — Myers Wolin LLC

(57) ABSTRACT

A public-key encryption system. Encryption of a k-bit plaintext m is performed by picking a random generating ciphertext and outputting the ciphertext. N is a non-prime integer (preferably the product of two primes p and q), y is an element in multiplicative group of integers modulo N, and k is an integer larger than 1, Decryption of ciphertext c using private key is performed by recovering such that holds and outputting plaintext m, wherein denotes the 2k-th power residue symbol modulo p, which is defined. Also provided are an encryption device and a decryption device. The encryption scheme provides better bandwidth than the Goldwasser-Micali encryption scheme.

12 Claims, 1 Drawing Sheet

(56) References Cited

OTHER PUBLICATIONS

Borisov et al., "Single-bit Re-encryption with Applications to Distributed Proof Systems", Workshop on Privacy in the Electronics Society 2007, Oct. 29, 2007, Alexandria, Virginia, USA, pp. 1-8.
Nowak, D., "On Formal Verification of Arithmetic-Based Cryptographic Primitives", Information Security and Cryptology—ICISC 2008, LNCS 5461, pp. 368-382.
Chen et al., "A New ElGamal-based Algebraic Homomorphism and Its Applications", 2008 ISECS International Colloquium on Computing, Communication, Control, and Management, Aug. 3, 2008, vol. 1, pp. 643-648.
Bringer et al., "An Authentication Protocol with Encrypted Biometric Data", 1st International Conference on Cryptology in Africa—Africacrypt 2008, Jun. 11, 2008, Casablanca, Morocco, pp. 1-42.
Desmedt et al., "A Generalization and a Variant of Two Threshold Cryptosystems Based on Factoring", Information Security, Proceedings, LNCS 4779, 2007, pp. 351-361.
Blum et al., "A simple unpredictable pseudo-random number generator", Society for Industrial and Applied Mathematics Journal of Computing, May 1986, vol. 15, No. 2, pp. 364-383.
Banaloh, J., "Verifiable secret-ballot élections", Yale University Department of Computer Science, PHD Thesis, Sep. 1987, pp. 1-135.
Cohen et al., "A Robust and Verifiable Cryptographically Secure Election Scheme", 26th Annual Symposium on Foundations of Computer Science 1985, Portland, Oregon, USA, Oct. 21, 1985, pp. 372-382.
Naccache et al., "A new public key cryptosystem based on higher residues", Proceedings of the 5th ACM Conference on Computer and Communications Security, ACM, New York, 1998, pp. 59-66.
Okamoto et al., "A new public-key cryptosystem as secure as factoring", Advances in Cryptology—Eurocrypt 1998, Espoo, Finland, May 31, 1998, pp. 308-318.
Pailler, P., "Public-Key Cryptosystems Based on Composite Degree Residuosity Classes", Advances in Cryptology—Eurocrypt 1999, LNCS 1592, pp. 223-238.
Monnerat et al., "Optimization of the MOVA Undeniable Signature Scheme", Progress in Cryptology—Mycrypt 2005, LNCS 3715, pp. 196-209.
Monnerat et al., "Generic Homomorphic Undeniable Signatures", 10th International Conference on the Theory and Application of Cryptology and Information Security—Asiacrypt 2004, Jeju Island, South Korea, Dec. 5, 2004, LNCS 3329, pp. 354-371.
Scheidler et al., "A Public-Key Cryptosystem Utilizing Cyclotomic Fields", Designs, Codes and Cryptography 1995, vol. 6, No. 2, pp. 117-131.
Monnerat et al., "Undeniable Signatures Based on Characters: How to Sign with One Bit", Public Key Cryptography—PKC 2004, LNCS 2947, pp. 69-85.
Blum et al., "Comparison of two pseudo-random number generators", Advances in Cryptology—CRYPTO 1982, Santa Barbara, California, USA, Aug. 23, 1982, pp. 61-78.
Blum et al., "An efficient probabilistic public-key encryption scheme which hides all partial information", Advances in Cryptology—CRYPTO 1984, Springer, 1984, pp. 289-302.
Birrell et al., "Composition of Zero-Knowledge Proofs with Efficient Provers", Theory of Cryptography, Proceedings 7th Theory of Cryptography Conference, Feb. 9, 2010, Zurich, Switzerland, LNCS 5978, pp. 1-17.
Goldreich, O., "Foundations of Cryptography: vol. 1, Basic Tools", Cambridge University Press, New York, 2001, pp. 1-393.
Goldreich, O., "The Foundations of Modern Cryptography", Algorithims and Combinations, vol. 17, Jul. 14, 1997, pp. 1-33.
Joye et al., "Fast generation of prime numbers on portable devices: An update", Cryptographic Hardware and Embedded Systems, Goubin and Matsui—Editors, Lecture Notes in Computer Science, vol. 4249, 2006, pp. 160-173.
Katz et al., "Introduction to Modern Cryptography", CRC Press, Boca Raton, 2007, pp. 1-512.
Kurosawa et al., "General public key residue cryptosystems and mental poker protocols", I. B. Damgaard, editor, Advances in Cryptology, Eurocrypt 1990, Lecture Notes in Computer Science, vol. 473, 1991, pp. 374-388.
Sahai, A., "Non-malleable non-interactive zero knowledge and adaptive chosen-ciphertext security", 40th Annual Symposium on Foundations of Computer Science, New York, New York, USA, Oct. 17, 1999, pp. 1-11.
Shoup, V., "A Computational Introduction to Number Theory and Algebra", Cambridge University Press, 2nd edition, Cambridge, 2010, pp. 1-598.
Shoup, V., "Why chosen ciphertext security matters", IBM Technical Report Rz 3076, Computer Science/Mathematics, 23 Nov. 1998, pp. 1-27.
Yan, S., "Number Theory for Computing", Springer, New York, 2nd edition, 2002, pp. 1-230.
Zheng et al., "Residuosity problem and its applications to cryptography", Transactions of the Institute of Electronics, Information and Communication Engineers, vol. E-71, No. 8, Aug. 1988, pp. 759-767.
Coppersmith, D., "Small solutions to polynomial equations, and low exponent RSA vulnerabilities", Journal of Cryptology, vol. 10, No. 4, Jan. 1, 1997, pp. 233-260.
Cramer et al., "Universal hash proofs and a paradigm for adaptive chosen ciphertext secure public-key encryption", Advances in Cryptology, Eurocrypt 2004, Knudsen—Editor, Lecture Notes in Computer Science, vol. 2332, Dec. 12, 2001, pp. 45-64.
Golreich, O., "Foundations of Cryptography, Volume II Basic Applications", Cambridge University Press, New York, 2004, pp. 1-449.
Sung et al., "A probabilistic encryption using very high residuosity and its applications", Global Telecommunications Conference, Singapore, Malaysia, Nov. 14, 1995, pp. 1179-1182.
Scheidler, R., "A public-key cryptosystem using purely cubic fields", Journal of Cryptology, vol. 11, No. 2, Mar. 1, 1998, pp. 109-124.
Ireland, K., "A Classical Introduction to Modern Number Theory", vol. 84 of Graduate Texts in Mathematics, Springer, 2nd edition, New York, 1990, pp. 158-159.
Lemmermeyer, F., "Reciprocity Laws—Chapter 4. Power Residues and Gauss Sums", Springer Monographs in Mathematics, New York, 2000, pp. 1-42.
ISO/IEC 18033-2 Standard, "Information technology—Security techniques—Encryption algorithms—Part 2: Asymmetric ciphers", International Organization for Standardization, May 1, 2006, pp. 1-7.
Benaloh, J., "Dense Probabilistic Encryption", Proceedings of the workshop on Selected Areas of Cryptography, May 31, 2004, pp. 120-128.
Coppersmith, D., "Finding a small root of a bivariate integer equation; Factoring with high bits known", U. Maurer, Advances in Cryptology, Eurocrypt 1996, vol. 1070 of Lecture Notes in Computer Science, Springer-Verlag, Heidelberg, 1996, pp. 179-189.

\* cited by examiner

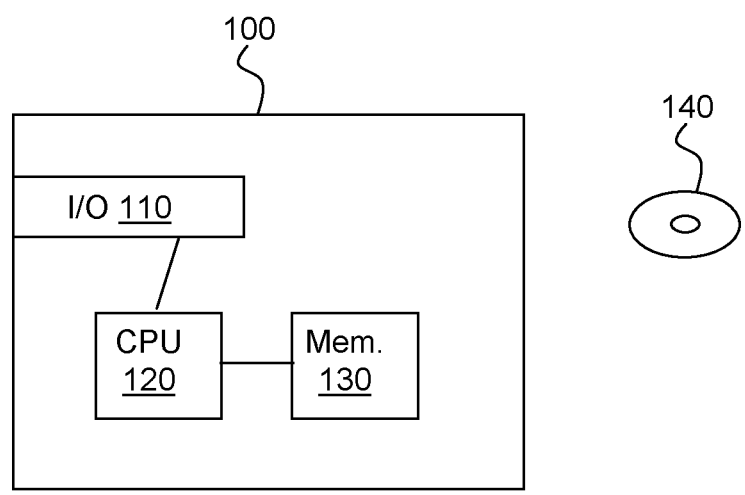

PUBLIC KEY ENCRYPTION SYSTEM BASED ON THE QUADRATIC RESIDUOSITY ASSUMPTION

This application Maims the benefit, under 35 U.S.C. §365 of International Application PCT/EP2011/066883, filed Sep. 28, 2011, which was published in accordance with PCT Article 21(2) on Apr. 12, 2012 in English and which claims the benefit of European patent applications No. 10305103.2, filed on Oct. 8, 2010 and No, 11306214.5, filed on Sep. 23, 2011.

TECHNICAL FIELD

The present invention relates generally to cryptography, and in particular to a public-key encryption system.

BACKGROUND

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

In 1984, Goldwasser-Micali described a public key encryption scheme; see Shafi Goldwasser and Silvio Micali. Probabilistic encryption. Journal of Computer and System Sciences, 28:270-299, 1984. The scheme has a particular interest because is proved under the Quadratic Residuosity Assumption, but it is not efficient in terms of bandwidth as each bit in the plaintext is expanded to the size of the composite modulus in ciphertext.

A first tentative to improve the efficiency of such scheme is due to Blum-Goldwasser (Manuel Blum and Shafi Goldwasser. An efficient probabilistic public-key encryption scheme which hides all partial information. In CRYPTO, pages 289-302, 1984). Their scheme achieves a better ciphertext expansion: the ciphertext has the same length of the plaintext plus an integer of the size of modulus. The scheme is proved semantically secure under the unpredictability of output of the Blum-Blum-Shub's pseudorandom generator which resides on factorisation hardness assumption. (See Lenore Blum, Manuel Blum, and Mike Shub. Comparison of two pseudo-random number generators. In CRYPTO, pages 61-78, 1982 and Lenore Blum, Manuel Blum, and Mike Shub. A simple unpredictable pseudo-random number generator. SIAM J. Comput., 15(2):364-383, 1986.) Details about the Blum-Goldwasser scheme can be found in The Foundations of Modern Cryptography by Oded Goldreich, 1997.

After the initial work by Golwasser and Micali, Benaloh and Fisher proposed a first generalisation of the Golwasser-Micali encryption scheme based on a Prime Residuosity Assumption. (See Josh Daniel Cohen Benaloh. Verifiable secret-ballot elections. PhD thesis, New Haven, Conn., USA, 1987, and Josh D. Cohen and Michael J. Fischer. A robust and verifiable cryptographically secure election scheme. In SFCS '85: Proceedings of the 26th Annual Symposium on Foundations of Computer Science, pages 372-382, Washington, DC, USA, 1985. IEEE Computer Society.) The basic idea is to consider as message space Z/eZ for a particular small prime e instead of Z/2Z as in Goldwasser-Micali, so achieving a better ciphertext expansion.

The main disadvantage of this scheme is that the decryption algorithm is very inefficient requiring a kind of exhaustive search (requiring then a small value of prime e to be practical).

An improved variant of this latter was given by Naccache and Stern considering e not as a prime but a product of small primes. This allows a faster decryption. (See David Naccache and Jacques Stern. A new public key cryptosystem based on higher residues. In ACM Conference on Computer and Communications Security, pages 59-66, 1998.)

A different approach of the same problem was proposed by Okamoto and Uchiyama who suggested to work with a particular modulus $N=p^2q$. This choice improves the bandwidth using as message space Z/pZ. (See Tatsuaki Okamoto and Shigenori Uchiyama. A new public-key cryptosystem as secure as factoring. In EUROCRYPT, pages 308-318, 1998.) Unfortunately, the scheme is vulnerable to a chosen-ciphertext attack that allows to recover the modulus factorisation, completely breaking the system.

Later, Paillier generalised the Okamoto-Uchiyama cryptosystem using $N^2$, the square of a standard composite modulus. The underlying problem used to prove the scheme is the N-th residuosity assumption. (See Pascal Paillier. Public-key cryptosystems based on composite degree residuosity classes. In EUROCRYPT, pages 223-238, 1999.)

Other applications of the more general theory of characters and residuosity can be found also in works by Monnerat and Vaudenay in the domain of undeniable signatures. (See Jean Monnerat, Yvonne Anne Oswald, and Serge Vaudenay. Optimization of the mova undeniable signature scheme. In Dawson and Vaudenay [9], pages 196-209; Jean Monnerat and Serge Vaudenay. Generic homomorphic undeniable signatures. In Pil Joong Lee, editor. Advances in Cryptology—ASIACRYPT 2004, Proceedings, volume 3329 of Lecture Notes in Computer Science. Springer, 2004, pages 354-371; and Jean Monnerat and Serge Vaudenay. Undeniable signatures based on characters: How to sign with one bit. In F. Bao et al., editors, Public Key Cryptography—PKC 2004, volume 2947 of Lecture Notes in Computer Science, pages 69-75. Springer-Verlag, 2004.) In these works, the authors focus on character of order 2, 3 and 4. The authors also provide an analysis and a classification of the problems related to the security of their schemes. Using the general theory of character in building cryptosystem appears also in "Undeniable signatures . . . " already mentioned and in a work by Renate Scheidler and Hugh C. Williams: A public-key cryptosystem utilizing cyclotomic fields. Des. Codes Cryptography, 6(2):117-131, 1995.

It can therefore be appreciated that there is a need for a solution that improves the Goldwasser-Micali scheme in that it improves the bandwidth while remaining proved secure under standard hardness assumption. This invention provides such a solution.

SUMMARY OF INVENTION

In a first aspect, the invention is directed to a method of encryption of a k-bit plaintext m. A device obtains plaintext m, picks a random $x \in Z_N^*$, generates ciphertext $c = y^m x^{2^k} \bmod N$, and outputs the ciphertext. N is a multiple of a product of two prime numbers p and q and N is not a square, y is an element in multiplicative group $Z^*_N$ of integers modulo N, k is an integer larger than 1 and exactly one value of $$\left(\frac{-1}{p}\right)_{2^k} \text{ and } \left(\frac{-1}{q}\right)_{2^k}$$

is equal to 1 and the other one is equal to −1, where $$\left(\frac{a}{p}\right)_{2^k} = a^{\frac{p-1}{2^k}} \bmod p.$$

In a first preferred embodiment, N=pq.

In a second aspect, the invention is directed to a method of decryption of a ciphertext c generated according to the method of the first aspect. A device obtains ciphertext c and private key p, recovers m∈{0, . . . , $2^k$−1} such that $$\left[\left(\frac{y}{p}\right)_{2^k}\right]^m = \left(\frac{c}{p}\right)_{2^k} (\bmod\ p)$$

holds, and outputs plaintext m.

$$\left(\frac{a}{p}\right)_{2^k}$$

denotes the $2^k$-th power residue symbol modulo p, which is defined as $$\left(\frac{a}{p}\right)_{2^k} = a^{\frac{p-1}{2^k}} \bmod p.$$

In a first preferred embodiment, the recovery of plaintext m=$(m_{k-1}, \ldots, m_0)_2$ is performed by the following steps:

| 1. | m ← 0; B ← 1 |
| 2. | for i = 1 to k do |
| 3. | $z \leftarrow \left(\frac{c}{p}\right)_{2^i}; t \leftarrow \left[\left(\frac{y}{p}\right)_{2^i}\right]^m \bmod p$ |
| 4. | if (t ≠ z) then m ← m + B |
| 5. | B ← 2B |
| 6. | end for |
| 7. | return m |

In a third aspect, the invention is directed to a device for encryption of a k-bit plaintext m. The device comprises a processor adapted to obtain plaintext m, pick a random x∈$Z_N^*$, generate ciphertext c=$y^m x^{2^k}$ mod N, and output the ciphertext. N a multiple of a product of two prime numbers p and q and N is not a square, y is an element in multiplicative group $Z_N^*$ of integers modulo N, k is an integer larger than 1 and exactly one value of $$\left(\frac{-1}{p}\right)_{2^k} \text{ and } \left(\frac{-1}{q}\right)_{2^k}$$

is equal to 1 and the other one is equal to −1, where $$\left(\frac{a}{p}\right)_{2^k} = a^{\frac{p-1}{2^k}} \bmod p.$$

In a first preferred embodiment, N=pq.

In a fourth aspect, the invention is directed to a device method of decryption of a ciphertext c generated according to the method of the first aspect. The device comprises a processor adapted to obtain ciphertext c and private key p, recover m∈{0, . . . , $2^k$−1} such that $$\left[\left(\frac{y}{p}\right)_{2^k}\right]^m = \left(\frac{c}{p}\right)_{2^k} (\bmod\ p)$$

holds, and output plaintext m.

In a fifth aspect, the invention is directed to a computer program product having stored thereon instructions that, when executed by a processor, performs the method of any one of the embodiments of the method of the first aspect.

In a sixth aspect, the invention is directed to a computer program product having stored thereon instructions that, when executed by a processor, performs the method of any one of the embodiments of the method of the second aspect.

BRIEF DESCRIPTION OF DRAWINGS

Preferred features of the present invention will now be described, by way of non-limiting example, with reference to the accompanying drawings, in which FIG. 1 illustrates an apparatus for performing an exponentiation resistant against skipping attacks according to a preferred embodiment of the invention.

DESCRIPTION OF EMBODIMENTS

For illustrative purposes, the present invention will be described as applied to the square-and-multiply algorithm, but the skilled person will appreciate that it may easily be modified to any other exponentiation algorithm.

A generic public-key encryption scheme may be defined as follows:

A public key encryption scheme is a tuple of polynomial probabilistic algorithms (KeyGen, Encrypt, Decrypt):

KeyGen(·) takes as input a security parameter K and outputs a pair (pk, sk) containing the public and the secret key.

Encrypt(·,·): performs encryption. Takes as input a plaintext m and a public key pk; outputs the ciphertext c=Encrypt(pk, m).

Decrypt(·,·): a deterministic decryption algorithm that takes as input a ciphertext c and a secret key sk; outputs the plaintext m.

The public-key encryption scheme of the present invention works as follows.

KeyGen(K): On input security parameter K, KeyGen generates an integer k>1 and two random primes p, q≡1 (mod $2^k$) and forms N=pq. KeyGen also defines y∈$Z_{N^*}$ such that $y∈J_2$(N)\QR(N). The skilled person will appreciate that q is not necessarily prime, but that it may for example be a product of primes or a power of a prime. It is preferable that q does not equal p; N is preferably difficult to factorize.

For an integer a co-prime to N=pq, the Jacobi symbol is defined as the product of the corresponding Legendre symbols, namely $$\left(\frac{a}{N}\right) = \left(\frac{a}{p}\right)\left(\frac{a}{q}\right).$$

This gives rise to the set $J_2(N)$ of integers whose Jacobi symbol is 1, $$J_2(N) = \left\{ a \in Z_N^* \,\bigg|\, \left(\frac{a}{N}\right) = 1 \right\}.$$

QR(N) is the subset of quadratic residues modulo N, $$QR(N) = \left\{ a \in Z_N^* \,\bigg|\, \left(\frac{a}{p}\right) = \left(\frac{a}{q}\right) = 1 \right\}.$$

It is preferred that exactly one value of $$\left(\frac{-1}{p}\right)_{2^k} \text{ and } \left(\frac{-1}{q}\right)_{2^k}$$

is equal to 1 and the other one is equal to −1, where $$\left(\frac{a}{p}\right)_{2^k} = a^{\frac{p-1}{2^k}} \bmod p,$$

that is either $$\left(\frac{-1}{p}\right)_{2^k} = 1 \text{ and } \left(\frac{-1}{q}\right)_{2^k} = -1 \text{ or } \left(\frac{-1}{p}\right)_{2^k} = -1 \text{ and } \left(\frac{-1}{q}\right)_{2^k} = 1.$$

The public key is pk={N, y, k} and the private key is sk={p}.

Encrypt(pk, m): Input is plaintext message $m \in \{0, \ldots, 2^k-1\}$. Encrypt outputs the encryption of message m under public key pk={N, y, k}. Ciphertext c=Encrypt(pk, m) is computed as follows:
  pick a random $x \in Z_N^*$; and
  set $c = y^m x^{2^k} \bmod N$.

Decrypt(sk, c): Decrypt recovers the plaintext m from the input ciphertext c using private key sk={p} and outputs the plaintext m, by:
  1. computing $$z = \left(\frac{c}{p}\right)_{2^k};$$

2. finding $m \in \{0, \ldots, 2^k-1\}$ such that $$\left[\left(\frac{y}{p}\right)_{2^k}\right]^m = z \,(\bmod\, p)$$

holds,
wherein $$\left(\frac{y}{p}\right)_{2^k}$$

denotes the $2^K$-th power residue symbol modulo p, which is defined as $$\left(\frac{y}{p}\right)_{2^k} = y^{\frac{p-1}{2^k}} \bmod p.$$

For a small value of k an exhaustive search is feasible to recover m. However, for larger values of k, it may be more efficient to proceed as follows:

---

Input: c, p, y
Output: $m = (m_{k-1}, \ldots, m_0)_2$

1. $m \leftarrow 0$; $B \leftarrow 1$
2. for i = 1 to k do
3. $z \leftarrow \left(\frac{c}{p}\right)_{2^i}$; $t \leftarrow \left[\left(\frac{y}{p}\right)_{2^i}\right]^m \bmod p$
4. if $(t \neq z)$ then $m \leftarrow m + B$
5. $B \leftarrow 2B$
6. end for
7. return m

---

FIG. 1 illustrates a device according to a preferred embodiment of the present invention. The device 100 comprises at least one interface unit 110 adapted for communication with other devices (not shown), at least one processor 120 and at least one memory 130 adapted for storing data, such as accumulators and intermediary calculation results.

In a first preferred embodiment, the processor 120 is adapted to encrypt plaintext m using the encryption method described herein. In a second preferred embodiment, the processor 120 is adapted to decrypt ciphertext c using any of the embodiments of the decryption method described herein. In a third preferred embodiment, the processor 120 is adapted to encrypt a plaintext m and to decrypt a ciphertext c. A computer program product 140 such as a CD-ROM or a DVD comprises stored instructions that, when executed by the processor 120, performs the method according to any of the embodiments of the invention, i.e. encryption, decryption or both encryption and decryption.

It will be appreciated that the public-key encryption system of the embodiments of the present invention can provide a scheme that:
  is proved secure under standard hardness assumption;
  provides better bandwidth than Goldwasser-Micali.
  is homomorphic: the product of ciphertexts for a number of plaintexts is the encryption of the sum of the plaintexts;
  allows a compact description of the public key owing to the particular choice of primes p and q.

Each feature disclosed in the description and (where appropriate) the claims and drawings may be provided independently or in any appropriate combination. Features described as being implemented in hardware may also be implemented in software, and vice versa. Reference numerals appearing in the claims are by way of illustration only and shall have no limiting effect on the scope of the claims.

The invention claimed is:
1. A device for encryption, the device comprising:
a memory;
at least one processor configured to:
  detect plain text having at least one bit;
  generate two random prime numbers that are not equal to each other;
  generate a public key comprising a multiple of a product of the two random prime numbers, an ele- ment of a multiplicative group of integers modulo the multiple, and an integer larger than 1;

generate a random number from the multiplicative group of integers modulo the multiple; and generate a ciphertext based at least partially on the public key and a formula $y^m x^{2^k}$, such that m is the plain text; x is the random number; y is the element of the multiplicative group of integers modulo the multiple; and k is the integer larger than 1, in which $y \in J2(N)\backslash QR(N)$ such that N is the multiple, J2(N) is a set of integers associated with N whose Jacobi symbol is 1, and QR(N) is a subset of quadratic residues modulo N.

2. A method for encryption, the method comprising:

detecting, using at least one processor, plain text having at least one bit;

generating, using the at least one processor, two random prime numbers that are not equal to each other;

generating, using the at least one processor, a public key comprising a multiple of a product of the two random prime numbers, an element of a multiplicative group of integers modulo the multiple, and an integer larger than 1;

generating, using the at least one processor, a random number from the multiplicative group of integers modulo the multiple; and setting, using the at least one processor, a ciphertext based at least partially on a formula $y^m x^{2^k}$, such that m is the plain text; x is the random number; y is the element of the multiplicative group of integers modulo the multiple; and k is the integer larger than 1, in which $y \in J2(N)\backslash QR(N)$ such that N is the multiple, J2(N) is a set of integers associated with N whose Jacobi symbol is 1, and QR(N) is a subset of quadratic residues modulo N.

3. The device of claim 1, wherein the product of the two random prime numbers is equal to 1 (mod 2k) such that the product minus 1 is divisible by $2^k$.

4. The device according to claim 1 wherein the at least one processor is further configured to set a private key equal to one of the two random prime numbers.

5. The method according to claim 2, wherein the product of the two prime numbers is equal to 1 (mod $2^k$) such that the product minus 1 is divisible by $2^k$.

6. The method according to claim 2, further comprising setting, using the at least one processor, a private key equal to one of the two random prime numbers.

7. A device for decryption, the device comprising:

a memory;

at least one processor configured to:

detect a ciphertext based at least partially on a random number from a multiplicative group of integers modulo a multiple of a product of two random prime numbers and a formula $y^m x^{2^k}$, such that m is a plain text; x is the random number; y is an element of the multiplicative group of integers modulo the multiple; and k is an integer larger than 1, in which $y \in J2(N) \backslash QR(N)$ such that N is the multiple, J2(N) is a set of integers associated with N whose Jacobi symbol is 1, and QR(N) is a subset of quadratic residues modulo N;

detect a private key equal to one of two random prime numbers whose product is equal to 1 (mod $2^k$) such that the product minus 1 is divisible by 2; and decrypt the ciphertext based at least partially on a $2^k$ power residue symbol associated with the ciphertext and the private key and the element of the multiplicative group of integers modulo the multiple of the two random prime numbers.

8. The device of claim 7, wherein, to decrypt, the at least one processor is further configured to apply the $2^k$ power residue symbol to each bit in the ciphertext to generate each bit of plain text.

9. A method of decryption, the method comprising:

detecting, using at least one processor, a ciphertext based at least partially on a random number from a multiplicative group of integers modulo a multiple of a product of two random prime numbers and a formula $y^m x^{2^k}$, such that m is a plain text; x is the random number; y is an element of the multiplicative group of integers modulo the multiple; and k is an integer larger than 1, in which $y \in J2(N)\backslash QR(N)$ such that N is the multiple, J2(N) is a set of integers associated with N whose Jacobi symbol is 1, and QR(N) is a subset of quadratic residues modulo N;

detecting, using the at least one processor, a private key equal to one of two random prime numbers whose product is equal to 1 (mod $2^k$) such that the product minus 1 is divisible by 2; and decrypting, using the at least one processor, the ciphertext based at least partially on a $2^k$ power residue symbol associated with the ciphertext and the private key and the element of the multiplicative group of integers modulo the multiple.

10. The method of claim 9, wherein the decrypting further comprises applying, using the at least one processor, the $2^k$ power residue symbol to each bit in the ciphertext to generate each bit of plain text.

11. A non-transitory computer readable medium with instructions stored therein which upon execution instruct at least one processor to:

detect plain text having at least one bit;

generate two random prime numbers that are not equal to each other;

generate a public key comprising a multiple of a product of the two random prime numbers, an element of a multiplicative group of integers modulo the multiple, and an integer larger than 1;

generate a random number from the multiplicative group of integers modulo the multiple; and generate a ciphertext based at least partially on the public key and a formula $y^m x^{2^k}$, such that m is the plain text; x is the random number; y is the element of the multiplicative group of integers modulo the multiple; and k is the integer larger than 1, in which $y \in J2(N)\backslash QR(N)$ such that N is the multiple, J2(N) is a set of integers associated with N whose Jacobi symbol is 1, and QR(N) is a subset of quadratic residues modulo N.

12. A non-transitory computer readable medium with instructions stored therein which upon execution instruct at least one processor to:

detect a ciphertext based at least partially on a random number from a multiplicative group of integers modulo a multiple of a product of two random prime numbers and a formula $y^m x^{2^k}$, such that m is a plain text; x is the random number; y is an element of the multiplicative group of integers modulo the multiple; and k is an integer larger than 1, in which $y \in J2(N)\backslash QR(N)$ such that N is the multiple, J2(N) is a set of integers associated with N whose Jacobi symbol is 1, and QR(N) is a subset of quadratic residues modulo N;

detect a private key equal to one of two random prime numbers whose product is equal to 1 (mod $2^k$) such that the product minus 1 is divisible by 2; and decrypt the ciphertext based at least partially on a $2^k$ power residue symbol associated with the ciphertext and the private key and the element of the multiplicative group of integers modulo the multiple.

\* \* \* \* \*